United States Patent [19]

Garcia Torres

[11] Patent Number: 5,657,685
[45] Date of Patent: Aug. 19, 1997

[54] MACHINE SUPPLYING FOOD PRODUCTS IN SLICES AND/OR DOSES OF SEMILIQUID PRODUCTS ON BREAD, EDIBLE CRUSTS OF PRESSED PRODUCTS OR TRAYS

[76] Inventor: Ramon Garcia Torres, Lope de Vega, 22-2°-2°-08191, Spain

[21] Appl. No.: 635,304

[22] Filed: Apr. 19, 1996

[51] Int. Cl.$^6$ .............. A21D 13/08; A23L 1/31; B65B 25/16
[52] U.S. Cl. .................. 99/450.4; 99/450.1
[58] Field of Search .............. 99/450.1–450.8, 99/494, 516, 534, 443 R, 443 C, 357, 325–334, 353–355; 426/274, 275; 83/703; 364/477, 478, 400; 221/150 A, 150 R, 151

[56] References Cited

U.S. PATENT DOCUMENTS

| | | | |
|---|---|---|---|
| 3,859,904 | 1/1975 | Carriazo | 99/450.4 |
| 4,202,260 | 5/1980 | Weger | 99/450.1 X |
| 4,537,121 | 8/1985 | Bero et al. | 99/450.6 X |
| 4,944,218 | 7/1990 | Cresson | 99/357 |
| 4,960,025 | 10/1990 | Fitch . | |
| 5,101,716 | 4/1992 | Cones, Sr. et al. | 99/450.5 |
| 5,113,754 | 5/1992 | Robinson et al. | 99/326 |
| 5,359,925 | 11/1994 | Forker | 99/450.8 |
| 5,365,835 | 11/1994 | Naramura | 99/450.5 |
| 5,458,055 | 10/1995 | Fitch, Jr. et al. . | |
| 5,493,958 | 2/1996 | Naramura | 99/450.5 |

FOREIGN PATENT DOCUMENTS

| | | |
|---|---|---|
| 591005 | 4/1994 | European Pat. Off. . |
| 2054363 | 2/1981 | United Kingdom . |

*Primary Examiner*—Timothy F. Simone
*Attorney, Agent, or Firm*—Klauber & Jackson

[57] ABSTRACT

A device including a bedplate (1) that supports a horizontal frame (3) imparted with alternating movement and having several independently moving rotating horizontal circular blades mounted thereon, wherein the blades (10) simultaneously cut loaves (13) of food products placed in vertical loaders (2, 16, 22) fastened to bridges (20) fixed to the bedplate (1), wherein the loaves (13) of product rest on base plates (17) placed transversally on the moveable horizontal frame (3) slightly lower than the plane of the cutting blade (10). The cut slices fall on a bottom conveyor belt (15) where they are collected, and the slices may selectively overlie or overlap previously cut slices. The device may be used to prepare varied sandwiches, "San Jacobos" (breaded and fried meat and cheese), "San Merinos" (breaded and fried fish and cheese), cordon bleu, breaded and fried cuts of meat, and the like.

46 Claims, 10 Drawing Sheets

MACHINE SUPPLYING FOOD PRODUCTS IN SLICES AND/OR DOSES OF SEMILIQUID PRODUCTS ON BREAD, EDIBLE CRUSTS OF PRESSED PRODUCTS OR TRAYS

BACKGROUND OF THE INVENTION

1. Field of the Invention

AS expressed in the title of this specification, the present invention refers to a machine supplying food products in slices and/or doses of semiliquid products on bread, edible bases of pressed products, or trays, with which varied sandwiches, "San Jacobos", "San Marinos", cordon bleu, breaded and fried cuts of meat, etc. can be automatically prepared. It is also specially designed to be included in the manufacturing line of these frozen food products and in the special case of preparing "San Jacobos", to cite one of its multiple uses, they come out of the machine perfectly prepared towards a conveyor belt to continue with the process of dipping in batter, breading, freezing and final packaging in independent units or blocks.

With this machine sandwiches can be prepared starting with products in loaves, which are cut into slices including the bread which forms the top and bottom.

Another object is the possibility of also supplying edible products in slices, other bulk, injected or poured products, in a specific dose, on the preparation that is being formed in the machine.

With the proposed machine, one manages to position perfectly in a overlying or stacked manner, the desired number of slices. They may also be placed in a stepped or overlapped manner on an edible bread crust or frozen pressed product, such as is required for the preparation of "San Marinos."

2. Description of the Prior Art

Presently the preparation of these above cited edible products, is done by hand by several operators that place the slices on a conveyor belt, these slices being previously cut and stacked or placed in blocks by means of the operators. This distribution by hand makes the product considerably more expensive, aside from the fact that the slices do not remain duly placed as is desired, There are present cutting machines, where it is not possible to include a continuous feed system of the product to be cut, supplied in portions, since the interruption of the process in order to carry out the reloading must inevitably take place. The preparation of the product to be supplied is finished by a manual process.

Automatic machines for the preparation or supply of some of these cited products are also known, but they have outstanding problems that reduce the quality of the finished product, as well as because they use functional devices that are not very precise, aside from the fact that an automatic process without interruptions is non achieved.

These conventional machines which we are referring to, include two or three loading heads with the product to be supplied, that are tiltable for the approach and advance thereof towards a handsaw that occupies a fixed position. It is necessary to interrupt the process in order to reload the product to be cut.

Another problem inherent to these machines, is the one represented by the inexactness in the overlapping of the products in slices, stacking being very difficult and therefore there must be two or three operators who replace the different layers of products. This problem is accentuated when the product to be cut is of a very fatty material, for examples lunch meats that are used to replace boiled ham, with a fat content higher than 60%. The adherence of the saw itself and the movement of the head make it impossible to achieve correct stacking.

Another problem that this type of conventional machines has is that the operating system of the different movable parts of the machine is hydraulic and in the event that the hose breaks, or due to any other problem of leaks, the product is damaged and the entire installation has to be cleaned.

Uniformity in the thickness of the slices is not achieved either, nor is overlapping foreseen for the same, at the beginning of the working day and after several hours of operation when the temperature of the hydraulic oil has substantially increased. The higher the temperature the more fluid the oil is and it is necessary to readjust the cutting heads.

SUMMARY OF THE INVENTION

In broad outline, the machine supplying food products in slices and/or doses of semiliquid products on bread, edible crusts of pressed products, or trays, that comprises the object of the invention, is comprised of a bedplate on which a frame that moves longitudinally is supported in a sliding manner with alternating movement. Several cutting heads, defined by disks or circular blades placed horizontally and that turn operated by the respective independent electric motors are mounted on this movable frame. These cutting stations, located at a certain distance from each other longitudinally simultaneously attack the product in loaves that is located in respective loaders that occupy fixed positions on the bedplate of the machine, anchored in an adjustable manner, as we will see later on, at respective bridges of the fixed structure of the machine.

The product in loaves rests by gravity on some base plates placed transversally on the movable frame, remaining slightly lower than the plane of the cutting blade. The loaders are tube-shaped portions with a advantageously quadrangular or rectangular contour, although they may have any other polygonal, circular or oval shape, inside of which the loaf of product is centered and in such a way that it can drop easily by gravity. In a preferred embodiment, these tube-shaped portions are formed by several elements so that they can extend or shorten in order to vary the section thereof, adapting it to the shade of the product in loaves.

The blade is located in a plane slightly lower than that of the mouth through which the product comes out of the loader, it being possible to adjust this height to optimize the cutting, as we will see hereinafter.

Each one of the blades is perfectly mounted on bearings and obtains its rotation movement by means of the respective electric motor integral with the movable frame.

When the movable frame advances towards the product to be cut, the circular blade starts cutting the slice with a previously established thickness, corresponding to the distance existing between the plane of the blade and the plane of the base plate of the frame, upon which the product loaves rests. The thickness of the slice is variable upon adjusting the height of the base plate, preferably with micrometric screws, located on each side of the machine to achieve great stability.

The slices cut simultaneously in the different cutting stations, since the different discoidal blades are mounted on the same frame (there being as many blades as cutting stations), are received on a conveyor belt that is supported and duly guided in the structure of the bedplate, its pulling movement being synchronized with the alternating movement of the cutting frame. The slices of product cut in the first cutting station, remain placed linearly and at the same distance on the conveyor belt. As these movements are synchronized, the slices formed in the second cutting station, remain located on the preceding ones, and so on and so forth with the different cutting stations.

In order to achieve total precision in the overlapping of slices, or stacking of the same, the conveyor belt can receive movement from the same motor that operates the cutting frame and that gives it alternating or reciprocating movement, carrying out this transmission preferably by toothed pinions.

Aside from the loading stations of product in loaves and of the respective cutting stations that define the circular blades of the movable frame, the existence of other stations to supply doses of bulk, injected or poured products on the preparation that advances along the conveyor belt, has been provided for. These dosing stations are located in the convenient position with regard to the loaders of product in loaves, depending on the characteristics of the product that they supply. The injection or pouring of the bulk product is controlled by a cell or position detector located in the movable frame, or else, by an integral element of the frame and that directly causes the discharge of a dose of product, in a specific point of the advance stroke of the frame.

It has been provided for that a same circular cutting blade, is capable of cutting more than one loaf of product located in the corresponding loader, upon three or more loaders in transversal arrangement being advantageously provided for. So that it is not necessary to use a large blade diameter, the center loader occupies a delayed position with regard to the side ones (in the event that there are three loaders existing in the same loading and cutting station), thus adjusting more to the curvature of the cutting edge, aside from allowing the approach of the support bearing of the discoidal blade, as well as its operating pulley from the respective electric motor, without it interfering with said center loader. Thus, the formation of sandwiches, "San Jacobes", "San Marinos" and other food products supplied by the machine, placed in triple line on the conveyor belt, in this case, is achieved.

The cutting units, instead of being comprised of rotating disks, can be alternating movement saws, of the blade type and with a straight or toothed edge depending on the product to be cut. These blades are normally operated by the respective motor-variator and the alternating or reciprocating movement thereof is carried out by means of a connecting rod-lever mechanism, guided transversally on the movable frame. This arrangement is especially applicable in large productions, in lines of pizzas, hamburgers, etc., where the machine can include ten or more loaders, in transversal direction to the conveyor belt. It would not make any sense to use disks since they would have an excessive diameter.

Since the feeding of the tube-shaped portions that define the loaders is done by the top part or inlet mouth of said loader, it is possible to include a continuous and automatic feed system, without the interruption of the process to carry out the reloading taking place, as is normally the case with present-day cutting machines. Even if the loaders were fed with the loaves of product by hand, the process would not be interrupted, which is a relevant characteristic of the machine of the invention.

The feed speed of the blades to produce the cutting of the product is rather higher than the feed speed of the conveyor belt, advantageously carried out in opposite directions, though they could take place in the same direction. Due to the proximity foreseen for the conveyor belt, the slices before being totally cut, rest progressively on the belt or on another slice or other slices cut in preceding stations. So that the alignment of the slices is perfect, it has been provided for that some guiding strips, fastened to the base plate on which the product in a loaf rests, fasten the slice that is being formed sideways, preventing it from moving and remaining out of position on the conveyor belt that receives it. These same guide strips extend obliquely in front of the cutting edge of the circular blade, seating the cutting edge, also serving as a scraping element to remove adherences from the product on the blade.

In order to proceed with the periodic cleaning of the continuous band of the conveyor belt, the band is removed from the machine as it is mounted on longitudinal guides and fastened with the tightening of the pertinent blocking means.

It has also been provided for that the vertical loaders that are mounted on respective transversal bridges of the bedplate, under which the movable cutting frame passes, can incline approximately 30° with regard to the frame, in order to supply elongated slices, for certain uses of the machine in supplying some customary market products.

The cutting blades have the edge beveled on the inside surface and a recess on the top reverse truncated cone-shaped surface, to optimize the cut upon reducing adherence. For the same purpose the blades may include an anti-skid surface coating such as a solid surface treatment and/or a layer of lubricant. The solid surface treatment may include Teflon or a similar material, and the blades may be lubricated edible oils to prevent the adherences of some products. For the same purpose, the discoidal surface of the blade can be occupied by grooves or holes, facilitating the movement of the product that is being cut.

The continuous band of the conveyor belt, instead of being smooth as in the case of preparing sandwiches, "San Jacobos", etc., in those that may or may not include bread bases, it is necessary that said band have the previous location of stations of trays, pressed fish products or the like, that may or may not be frozen, marked, on which the slices of ham, cheese, or the like are to be mounted, as well as other bulk products which will be injected in the corresponding stations of the machine, such as in the case of the preparation of "San Merinos", cordon bleu, breaded and fried cuts of meat, etc. In this case the endless band can have low longitudinal partition walls, as well as equidistant protrusions in longitudinal direction, marking alveoles, buckets or stations with a predetermined location, so that the perfect mounting of the slices and/or bulk products, such as tomato, ketchup, mustard, etc., can be achieved. Trays or other products coming from similar process lines may be located in these buckets, these buckets being adapted to the shape that the final product is to have.

In order to provide an easy understanding of the features of the invention and forming an integral part of this specification, some sheets of drawings in whose figures, the following has been represented in an illustrative and non-restrictive manner, are attached hereto.

DESCRIPTION OF A PREFERRED EMBODIMENT

Figure 1:
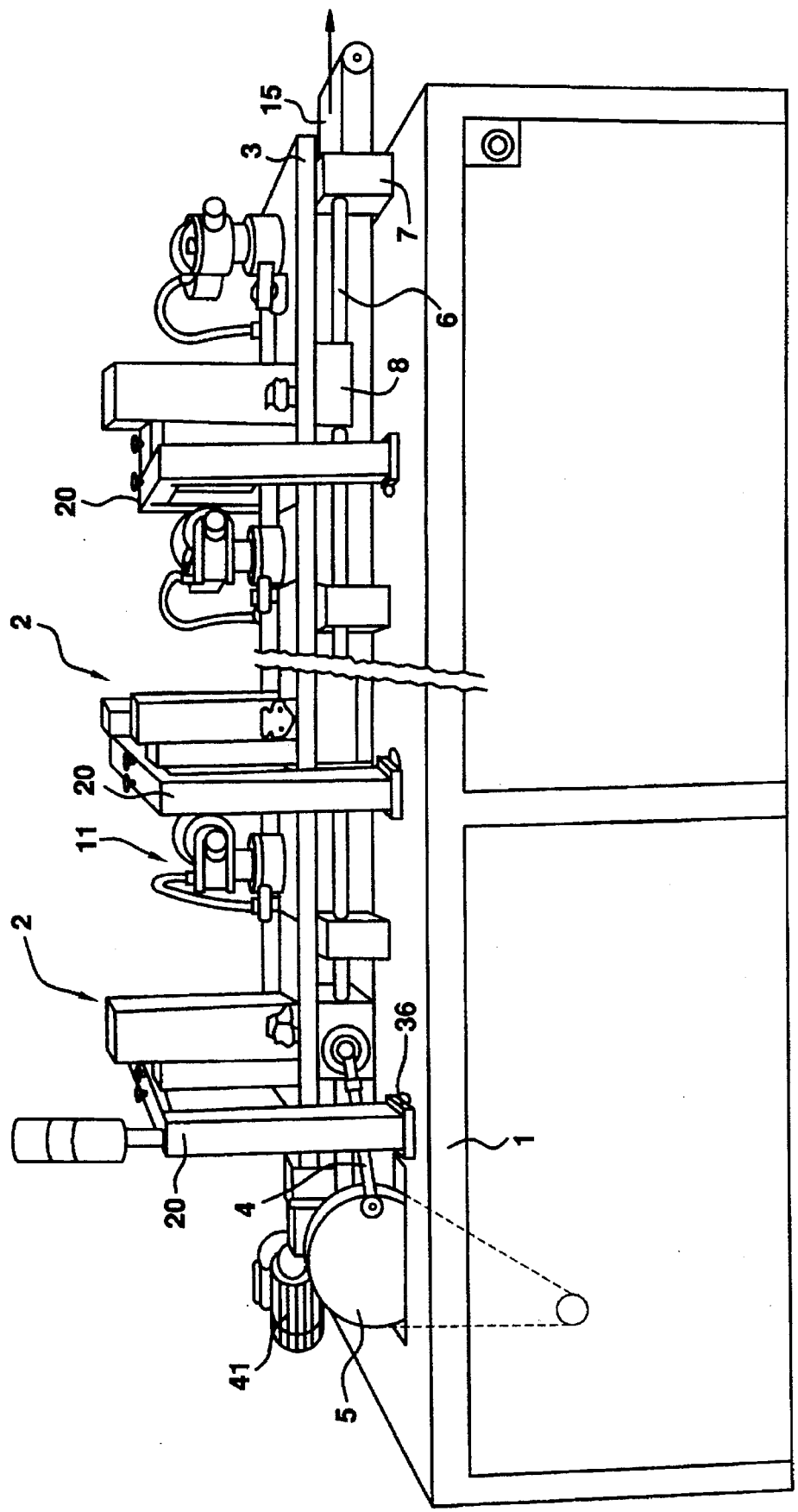
FIG. 1 is a schematic perspective view of the machine supplying food products in slices and/or doses of semiliquid products on bread, edible crusts of pressed products, or trays, according to the invention.

Referring to the numbering used in the figures, we can see how the machine that the invention proposes, is comprised of a bedplate (19) on which the different product loading stations are supported, each one of them generally referred to as number (2) and that are spaced longitudinally.

Frame (3) that moves with alternating movement, also longitudinally by means of the connecting rod (4) connected to an eccentric point of the plate (5) acting as a lever is also movably supported on the frame (1).

The movable frame (3) moves perfectly guided on longitudinal bare (6), located on both sides of the machine. The guide bars (6) rest on the bedplate (1) by means of fixed supports (7). Reference (8) designates the bearing supports that are immobilized to the frame (3).

Figure 2:
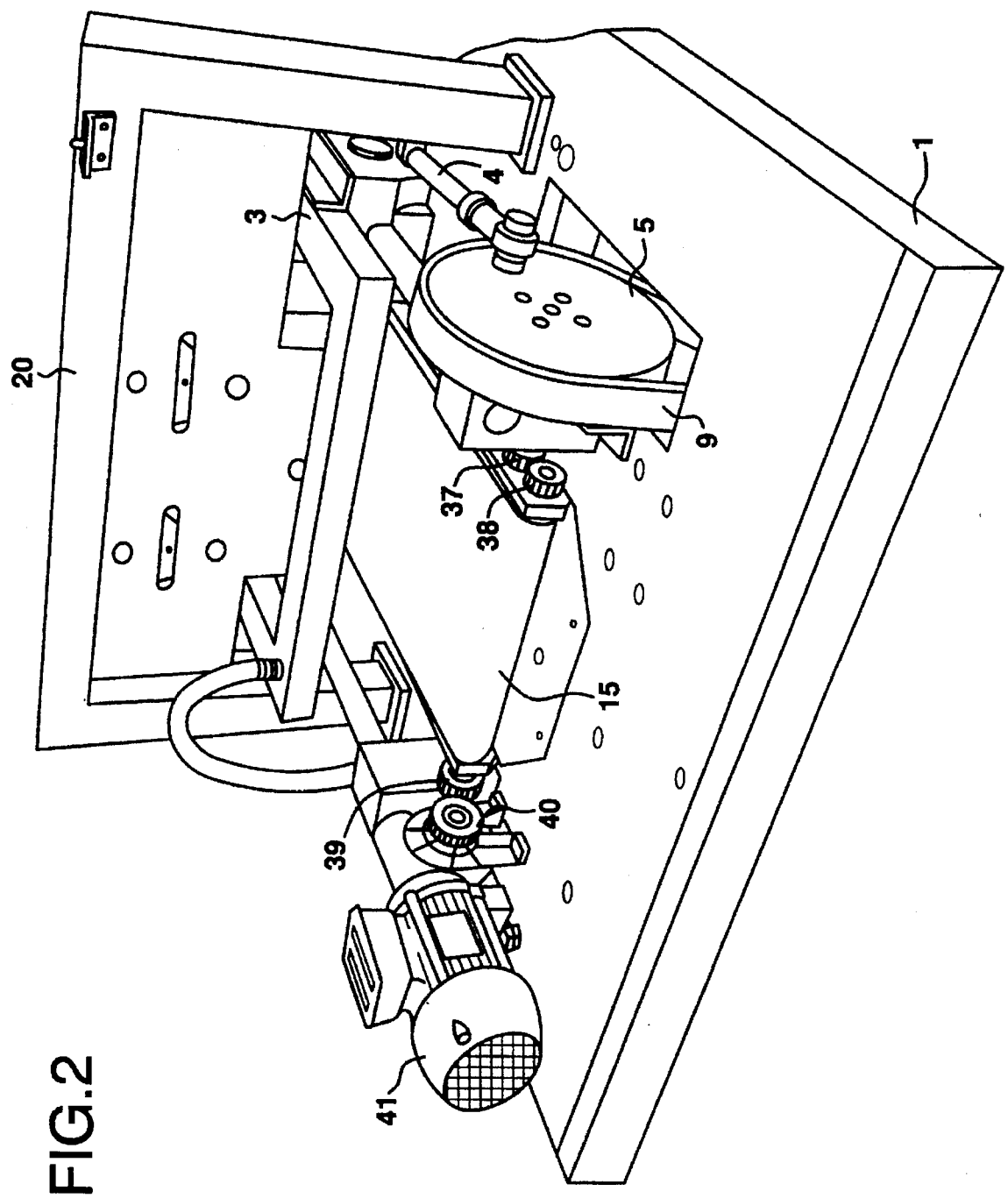
FIG. 2 is a perspective view at a larger scale of the rear part of the machine in order to see the operating system of the endless band and the movable frame.

The system operating the connecting rod (4) that moves the frame (3), by means of belt transmission (9) from a motor under the bedplate (1) is seen in FIG. 2.

Figure 3B:
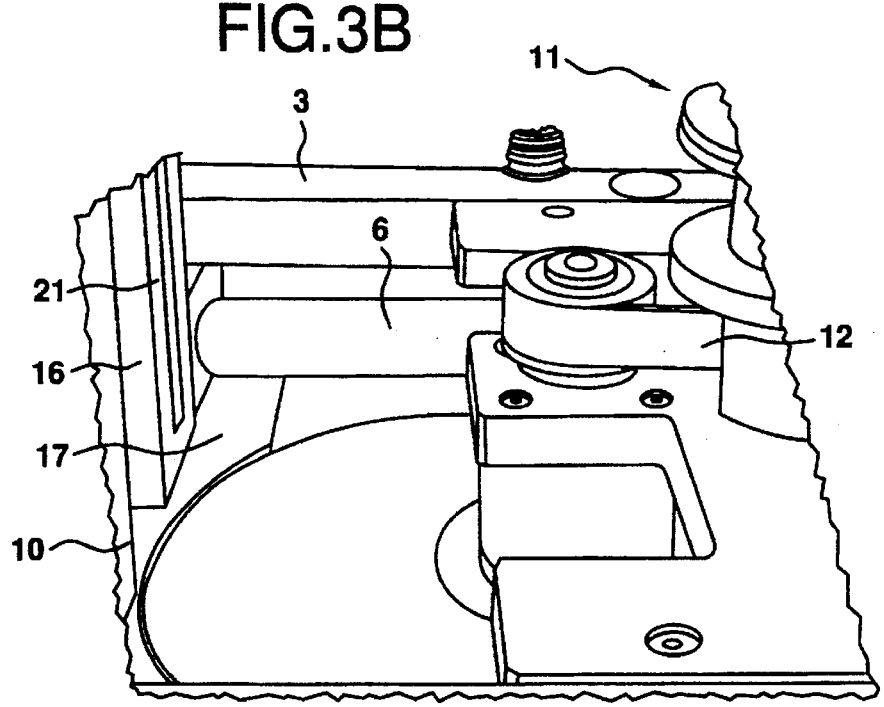
FIG. 3 is a perspective view of the font part of the same machine, with an enlarged detailed view in order to see the operation of one of the cutting blades of the movable frame.
Figure 3A:
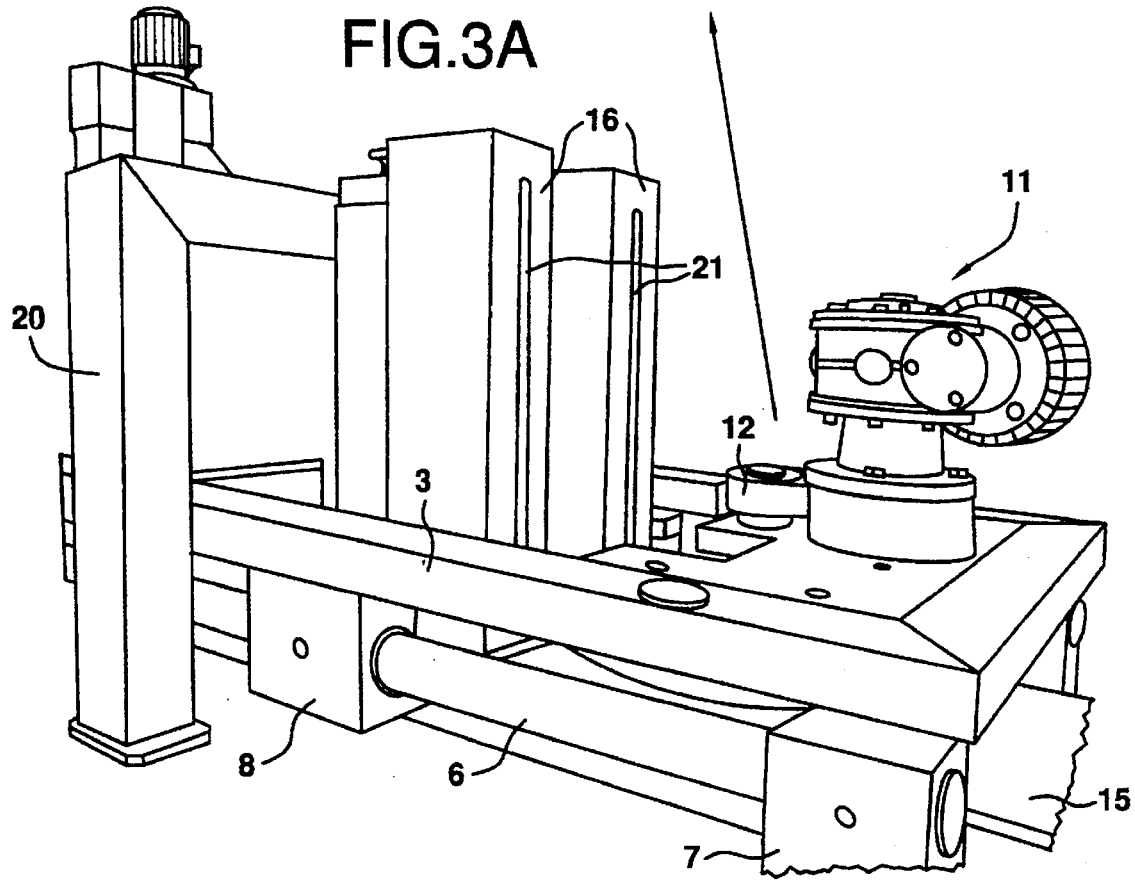

The discoidal blades (see FIG. 3) operated by the respective independent motor (11) and belt transmission (12) are mounted on the movable frame (3).

Figure 4A:
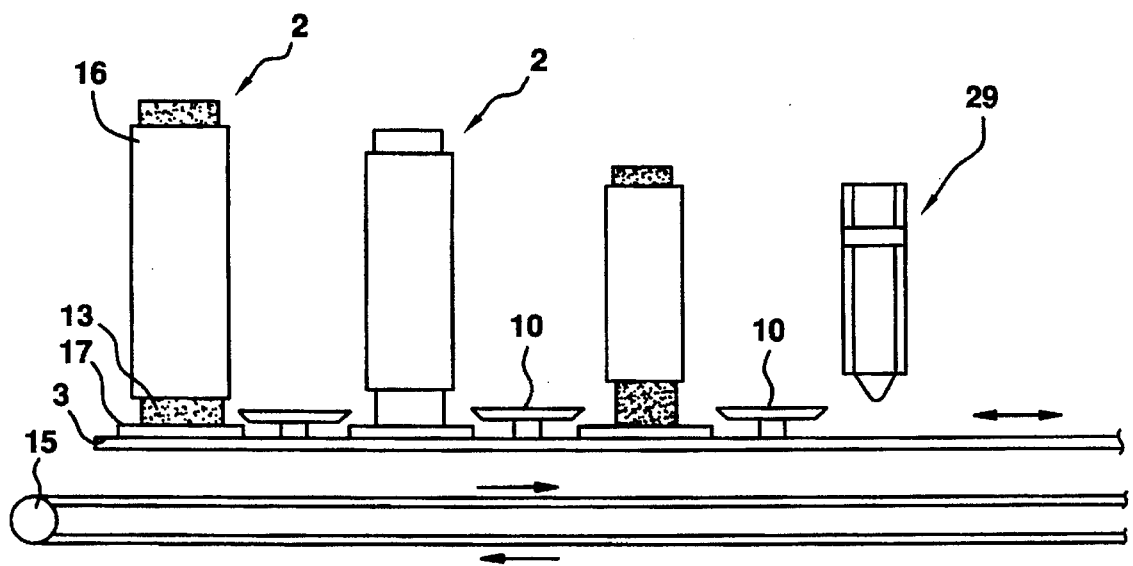
FIG. 4 is a longitudinal raised schematic view of the machine, where the different loading and cutting stations are shown schematically, according to two positions a and b that respectively represent the position of the movable frame before carrying out the cutting and when this cutting takes place so that the slices fall on the conveyor belt.
Figure 4B:
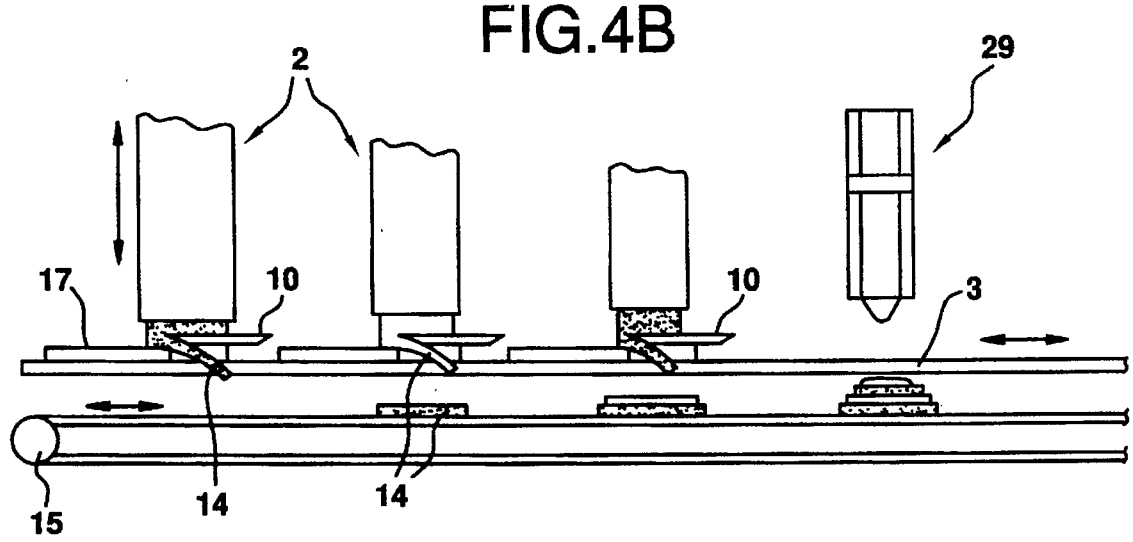

In FIG. 4 we can schematically see how the horizontal discoidal blades (10), in the advance movement of the frame (3), incide on the product in loaves (13) placed in the vertical loaders (2), to cut slices (14) of the product contained in them, this cutting being simultaneous.

Slices (14) fall on the conveyor belt (15) that is located under the frame (3) and very close to it.

In this embodiment shown in the figures, there are three tube-shaped portions containing the product in loaves (13), in each loading station (2). This is seen schematically in FIG. 5. The slices of three loaves of product (13) are cut by the same circular blade (10) and the diameter of the blade (10) is in correspondence with the amplitude of the loading station. In this FIG. 5 we can schematically see the phase difference provided for between the different loaders of a same loading station (2), for the reasons already explained above.

In transversal position to the frame (3), there are base plates (17) on which the loaves of product (13) rest. In FIG. 4 one can clearly see how as the frame (3) moves toward the cutting position (towards the left in this FIG. 4), the blades (10) and base plates (17) move simultaneously, gently placing the slices (14) on the conveyor belt (15), when the cutting operation ends.

Figure 5:
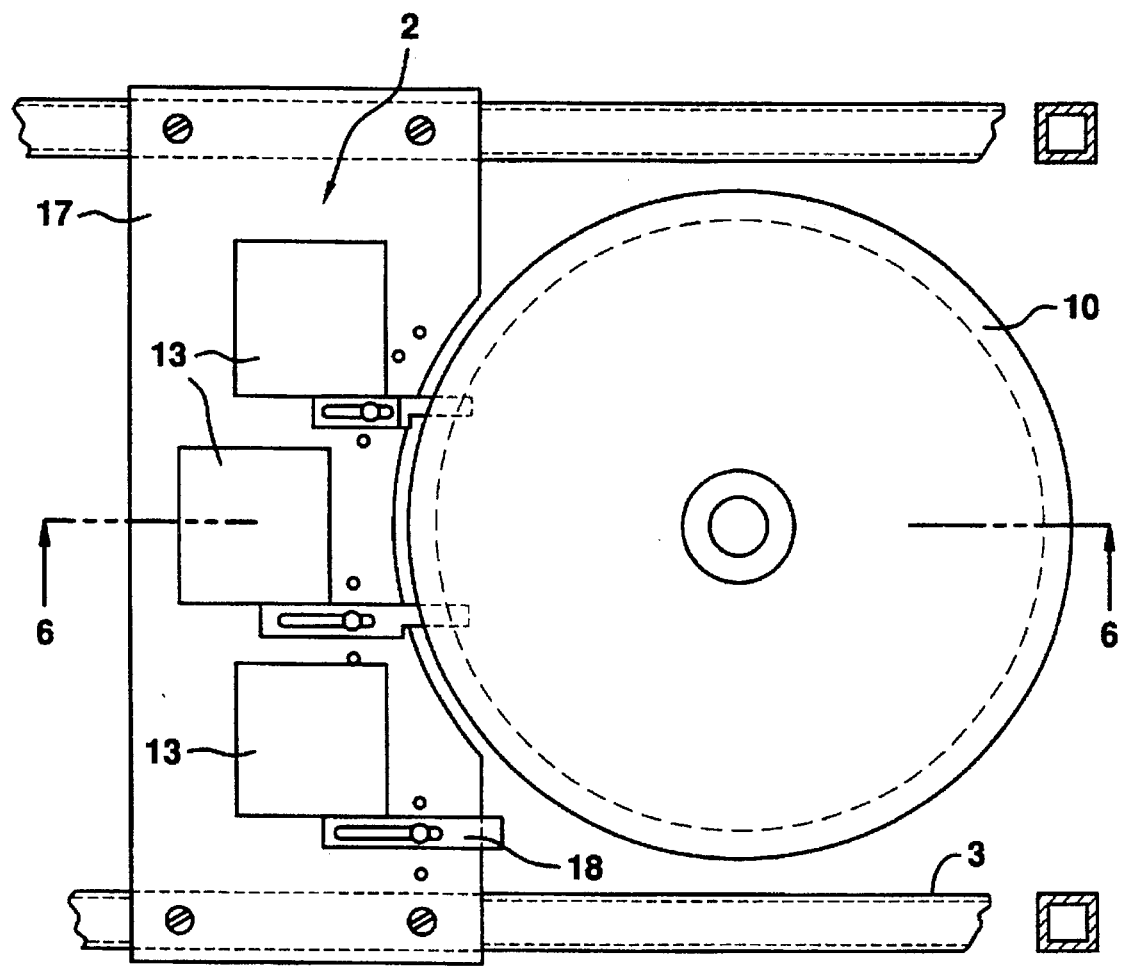
FIG. 5 is a plan schematic view where the movable frame and one of the circular cutting blades are partially shown, including the slice guide system, during the cutting of the slices. It also corresponds with the C–D cutting line section of FIG. 6.
Figure 6:
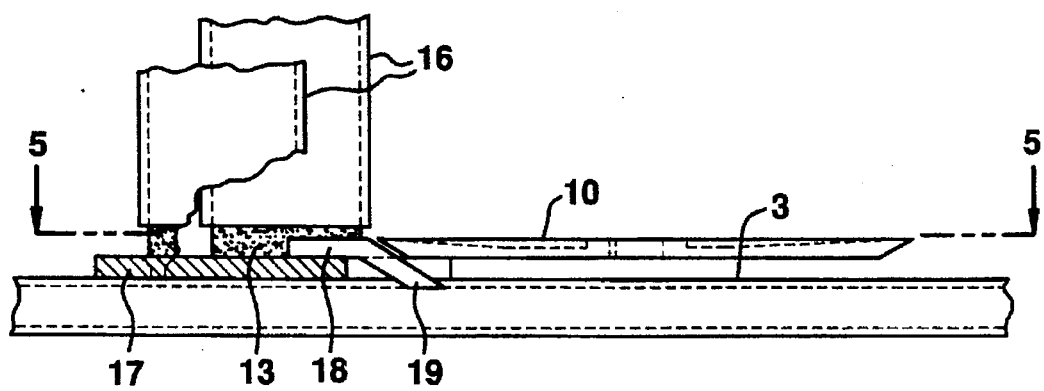
FIG. 6 is a section along the A–B cutting line of FIG. 5.

FIGS. 5 and 6 schematically show the guide strips (18) of the slices, during the cutting operation of said slices. They are adjustable longitudinally and also transversally. Reference (19) designates the cantilevered off part of the guide strips (18), placed obliquely to seat the cutting edge of the blade (10) and to serve as a scraper that removes adherences from the cut product.

The tube-shaped portions (16) that form that different leaders of the same or of the different loading station (2), are fastened to the transversal bridges (20), anchored in turn to the bedplate (1) to keep a fixed position.

Figure 7:
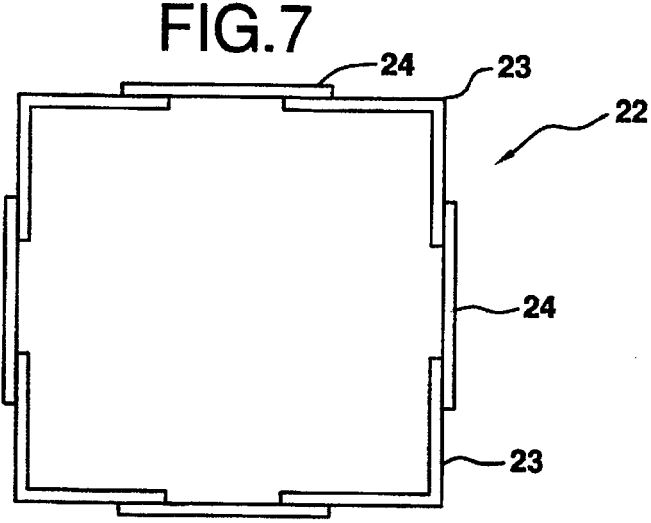
FIG. 7 is a schematic plan view of one of the loaders of product in loaves.

Each one of these leaders includes at least one vertical groove or slot (21) to control the existence of product, as well as to allow the removal of some remains of the same, as we had indicated at the beginning. In FIG. 7 we see with number (22) a loader formed by angular elements (23) that can be separated by the guides (24) to increase or decrease the section and to thus adjust the dimensions of the product in loaves (13).

Figure 8:
FIG. 8 is a raised view, with a sectioned quadrant, of one of the circular cutting blades.
Figure 9:
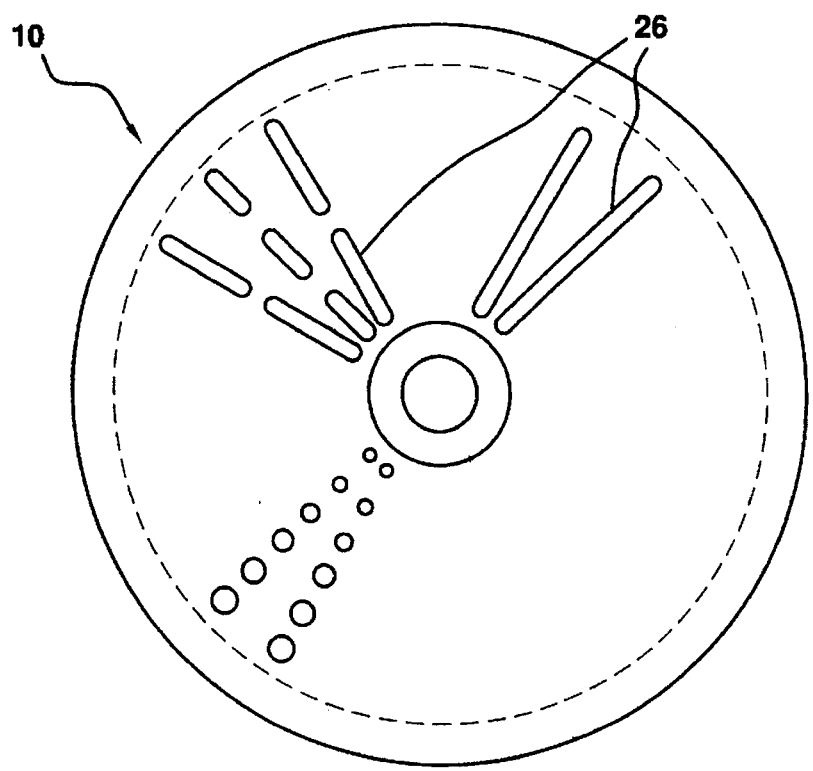
FIG. 9 is a plan view of one of these circular cutting blades, including different openings and holes to minimize friction during the cutting operation.

FIGS. 8 and 9 show the geometric shape of the cutting blades (10), in this embodiment shown in the figures. One starts with a disk whose top surface has a truncated cone-shaped concentric recess (25) to thus reduce the friction against the product to be cut. The cutting edge is obtained by making a bevel cut, the slant of the cantilevered off part (19) of the guide plates (18) of the slices that are being cut coinciding with this angle, so that the continuous seating of the cutting edge is produced. Reference (26) designates the openings or holes to minimize the friction of the blade (10) and to thus favor the sliding of the product.

Figure 10:
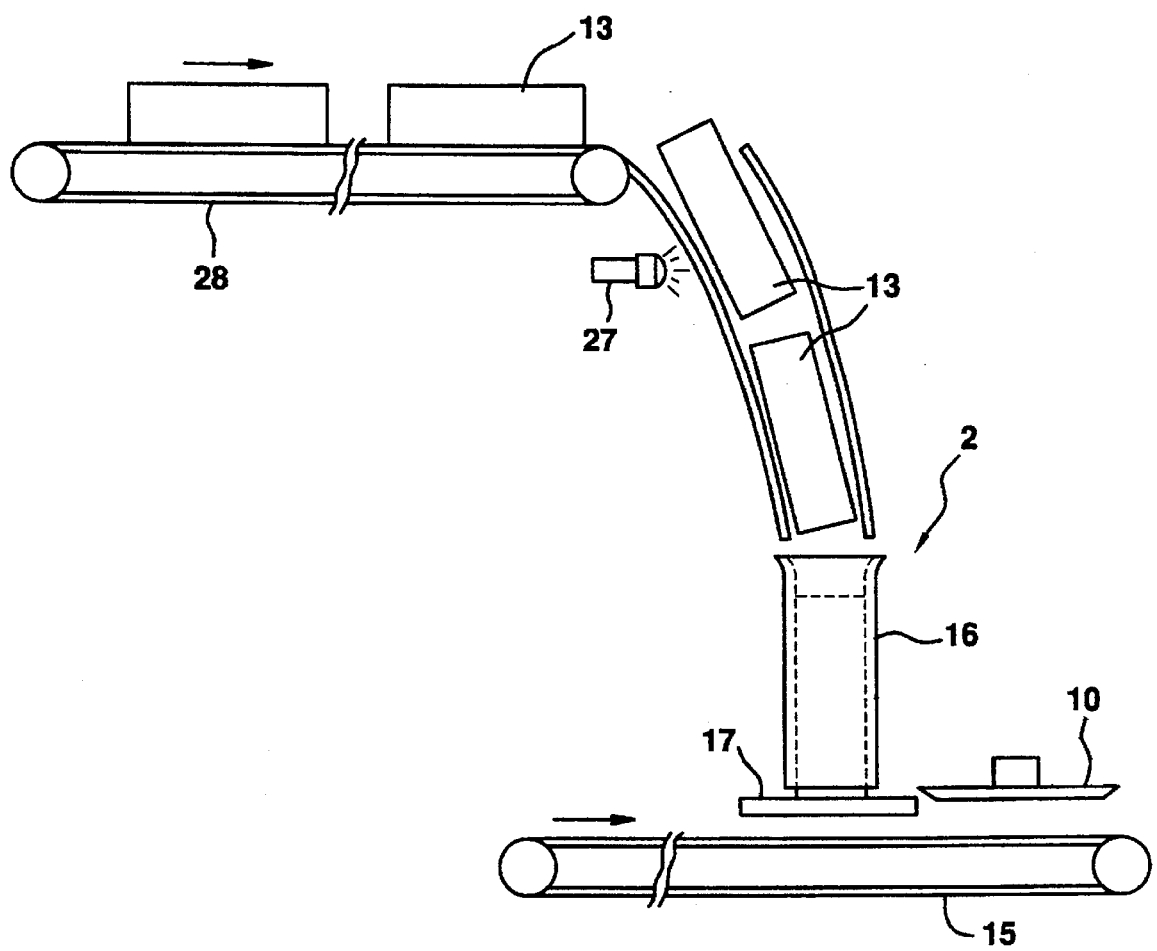
FIG. 10 is a longitudinal raised schematic view of the automatic feed system of each one of the loading stations of the machine.

FIG. 10 schematically shows the automatic feed system of the loaders with loaves of product to be cut into loaves, and usable for bread, boiled ham, cheese, etc. Reference (27) designates the product presence detector that controls the operation of the endless belt (28) of the feed system, thus keeping the loader (16) constantly full.

Now going back to FIG. 4, the machine that the invention proposes also includes the leading stations of product in loaves, referred to as (2), the supply stations of doses of bulk product, either injected or poured on a tray or any other preparation that advances on the bottom belt (15). This product dose supply station is generally referred to as number (29) and there may be more than one of these stations, longitudinally, since there will be three crosswise in this embodiment shown in the figures and naturally out of phase, just like the remaining leading stations (2).

Figure 11A:
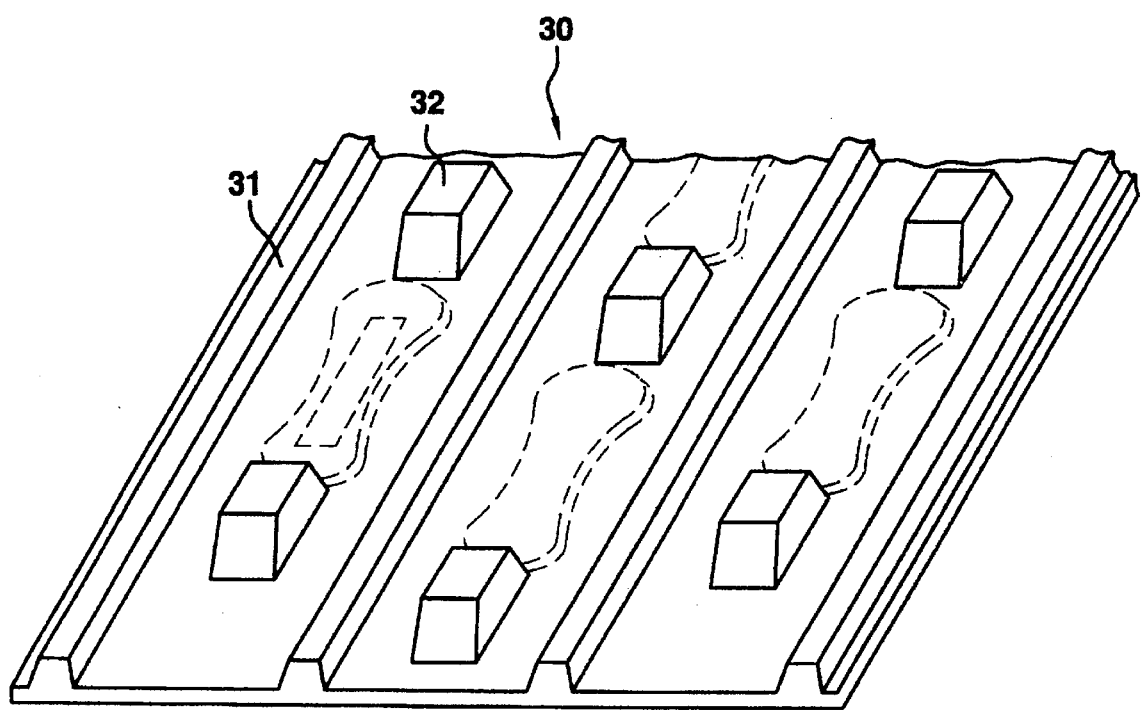
FIG. 11 is a partial view of the conveyor belt that can be used optionally when it is necessary to mount slices or other bulk products, on crusts that have to have access to the duly positioned to adequately receive the food products.
Figure 11B:
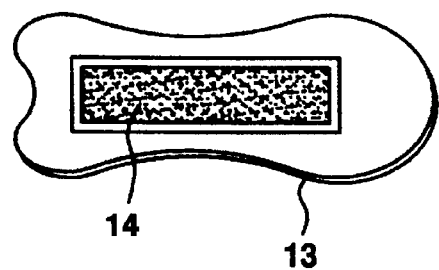

The conveyor belt (15), instead of having its band totally smooth, given that the slices that have access to it upon being cut, are placed in perfect alignment, as we have already seen above; there are preparations that require that the slices or bulk injected product, remain mounted on an edible crust that before entering the machine, has to be placed on the conveyor belt. In this case, the endless band has to be provided with alveoles or buckets and the structure thereof can have the shape shown in FIG. 11, in one of the preferred embodiments and when there are three transversal loading stations. This band is generally referred to as number (30) and it longitudinally includes continuous ribs (31) and equidistant plugs (32) that collaborate in fixing the location for the edible crusts (33), just as in the case of the preparation of "San Marinos", mounting one or more slices of product on them, as one can see in the enlarged detailed view of this FIG. 11.

Figure 12A:
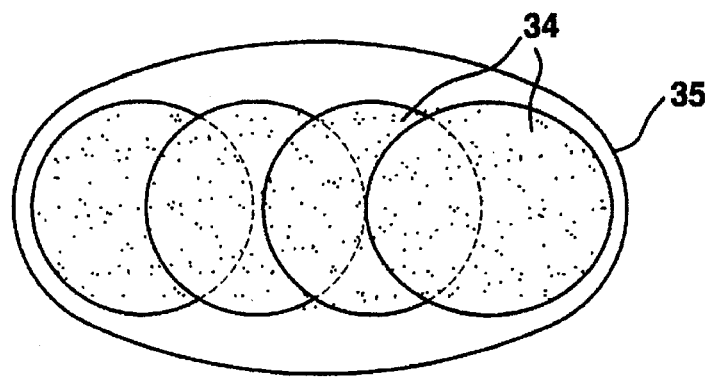
FIG. 12 shows a plan raised view of the preparation supplied by the machine, according to overlapped slices placed on a base product. They correspond no positions a and b respectively of this FIG. 12.
Figure 12B:
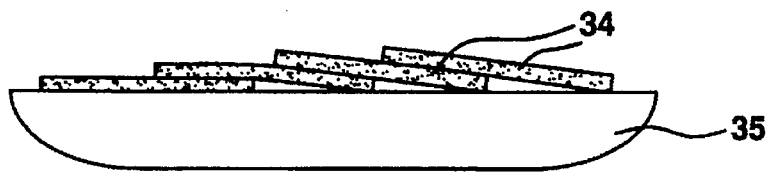

In FIG. 12 we see a schematic representation of the arrangement of overlapped slices (34) on an edible crust (35). The overlapping distance between slices can be adjusted by numeric control. The control of the speeds of the different movable elements of the machine is done from a control box not shown in the figures.

To achieve the mounting or stacking of slices as well as to achieve overlapped slices, there is an adjustment system determined by the way of anchoring the transversal bridges (20) to the bedplate (1), by slides (36) (see FIG. 1). Thus they can be advanced or delayed if the distance, or the pitch, between them were different. The overlapping of the slices could also be achieved by progressively increasing to the right the distance between the transversal bridges (20), in which case the overlapping of the slices shown in FIG. 12 would be achieved. If the pitch from left to right of FIG. 1 is reduced, in the feed direction of the conveyor belt (15), the overlapping of the slices would be to the contrary.

Mounting of the slices can also be achieved by adjusting the relative rotation speeds between the cutting frame (3) and the conveyor belt (15), by numeric control; by mechanical synchronism so that the mounting of the new slice inevitably takes place in the exact moment independently from the rotation speed of the motor variator that produces the alternating or reciprocating movement of the cutting frame (3). In effect, observing FIG. 2 one can see how the plate that moves the connecting rod (4) that operates the frame (3) with alternating movement, includes at the inside end of its shaft, a pinion (37) that gears with the operating pinion (38) of the driving roller of the conveyor belt (15), when the belt occupies an advanced position so that said gearing takes place.

The conveyor belt (15) has on the side opposite the pinion (38), another pinion (39) that is kept distant from the outlet pinion (40) of the reduction motor (41) that is controlled by the numeric control of the machine and that in these conditions is stopped. When the conveyor belt (15) is situated in the most delayed position, and its position is blocked when the pinion (39) gears with the pinion (40), the pinion (38) of the same remains distant from pinion (37) that turns with the plate (5). The movement of the belt (15) is thus obtained upon operating the reduction motor (41).

Observing FIG. 4 one understands that if the distance between the different stacks that are obtained on the conveyor belt (15), when coming out of the machine, was too big, it could happen that the time that goes by in the come and go movement of the cutting frame (3) were too small and therefore another slice would be cut and it would remain in an intermediate position contrary to what has been provided for. For this purpose, it is necessary to reduce the return speed of the cutting frame (3), after the last slice of the stack has been cut, upon sending a corresponding signal to the variator of the operating motor of the cutting frame.

Figure 13:
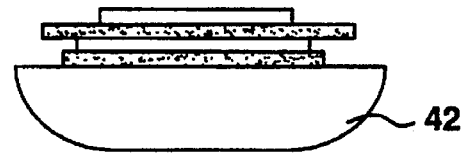
FIG. 13 is a raised schematic view of a preparation supplied by the machine, in overlapped slices on a crust.
Figure 14:
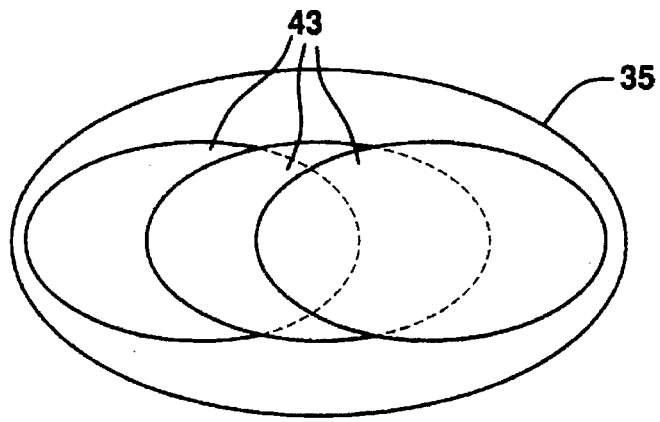
FIG. 14 is a plan schematic view of a preparation similar to the one shown in FIG. 12a, but with elongated slices.

FIG. 13 shows an edible crust (42) with a series of overlying slices. In FIG. 14 another edible product crust (35) has been represented, with elongated overlapping slices. These elongates slices, referred to as number (43), have been obtained upon placing the loaders (2) in an inclined position, as we have indicated at the beginning.

Figure 15:
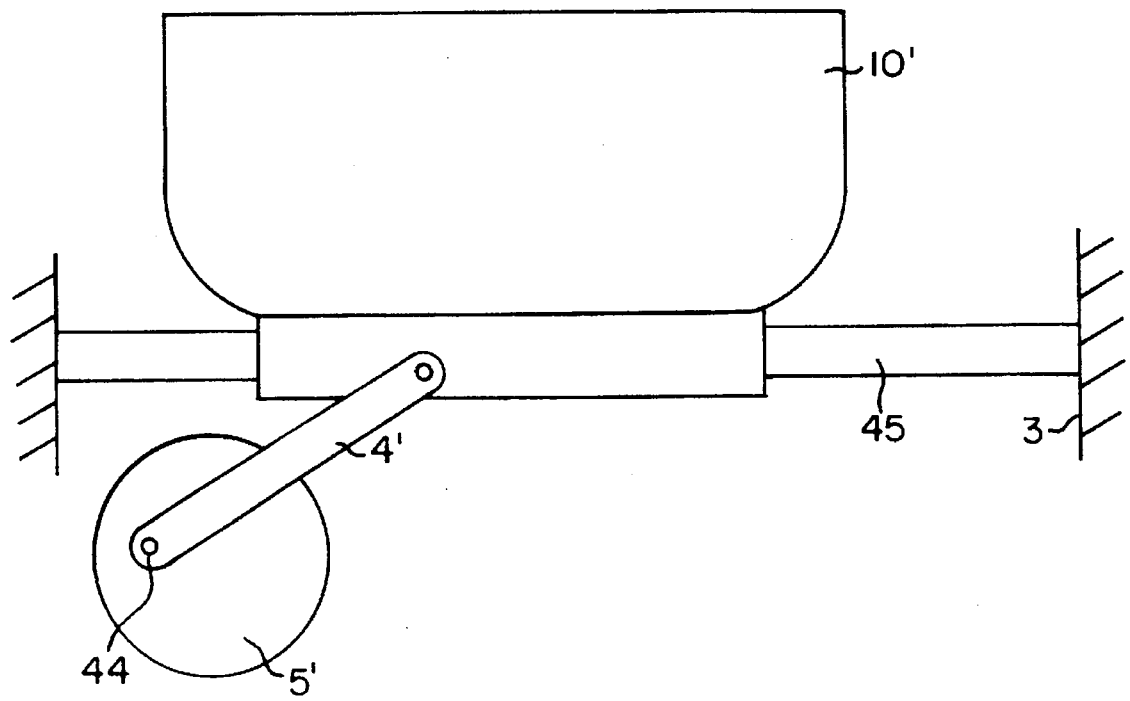
FIG. 15 is a schematic representation of an alternate embodiment of a cutting unit.

FIG. 15 shows an alternate embodiment of the cutting unit in the form of a reciprocating blade arrangement which includes a connecting rod (4'), a plate (5'), a lever (44) and a guide (45). The guide (45) is transversely mounted on the moveable frame (3). The connecting rod (4') is connected to an eccentric point on the plate (5') which acts as a lever (44). The connecting rod (4') is pivotally attached to, or movably supported on, the cutting blade (10') and the lever (44).

Thus, with the described structure and functionality a universal cutting, positioning, staking and dosing machine with a simple static head or multiple heads (of advantageously one to five product loading stations) with adjustable movement for slicing, stacking, stepping and dosing fresh, refrigerated and frozen food products (meat, poultry, fruit, vegetables, pasta, fish, bakery goods, pastries and milk products), is achieved.

The conveyor belt (15) has blocking means for locking it in the required correct position. Said conveyor belt can be removed, once these blocking means have been released, for periodic cleaning thereof, which is easily achieved as there are longitudinal guides in the bedplate (1).

I claim:

1. An apparatus for providing slices of food products from loaves, and/or doses of bulk, injectable, pourable, or semi-liquid products, onto bread, edible crusts, or trays, including products used in the preparation of one or more varieties of sandwiches, the apparatus comprising:

a bedplate;

a plurality of transverse bridges longitudinally spaced apart and fixedly attached to said bedplate;

a horizontal moveable frame mounted to said bedplate and capable of longitudinal reciprocating movement thereon;

a plurality of product loaders, each loader having a bottom mouth, wherein each of said loaders is fixedly attached to one of said bridges, wherein each bridge is capable of supporting one or more product loaders in transverse relationship, and wherein each loader is capable of receiving at least one product or at least one loaf of product by gravity feed and delivering the product through its respective bottom mouth;

a plurality of cutting means for slicing the products which exit said product loaders, each cutting means including a motor and a cutting blade adapted to slice the products exiting a corresponding one or more product loaders, wherein said cutting means are mounted to said moveable frame in longitudinally spaced apart relationship, and wherein each cutting blade is disposed lower than the bottom mouth of the corresponding one or more product loaders;

a plurality of base plates fixedly attached to said moveable frame, each base plate having a top surface disposed lower than the cutting blade of a corresponding cutting means, wherein each of said base plates is capable of limiting the downward movement of a corresponding product; and a conveyor belt disposed below said moveable frame, wherein said conveyor belt is capable of receiving the slices of product;

wherein said apparatus is capable of simultaneously slicing more than one product loaf; and wherein said apparatus is capable of delivering slices of the products onto said conveyor belt in an overlying or overlapping arrangement.

2. The apparatus according to claim 1 wherein said cutting blade further comprises a horizontal rotating circular blade.

3. The apparatus according to claim 1 wherein said cutting means further comprises means for reciprocating the cutting blade, including:

a guide transversely mounted on said moveable frame and adapted to slidingly receive said cutting blade;

a connecting rod having an end pivotally attached to said cutting blade; and a lever pivotally attached to an opposite end of the connecting rod;

wherein movement of said lever causes said cutting blade to move back and forth along said guide.

4. The apparatus according to claim 3 wherein said cutting blade further comprises a straight edge.

5. The apparatus according to claim 3 wherein said cutting blade further comprises a toothed edge.

6. The apparatus according to claim 3 wherein said cutting blade further comprises a saw.

7. The apparatus according to claim 1 further comprising:

an operating motor fixedly attached to the bedplate;

a lever attached to said operating motor; and a connecting rod having one end pivotally connected to said lever and an opposite end pivotally connected to said moveable frame;

wherein rotating movement of said lever causes said connecting rod and said moveable frame to move back and forth in a reciprocal motion.

8. The apparatus according to claim 7 further comprising:

an operating pinion capable of being rotated by said operating motor;

a conveyor driving roller; and a first conveyor pinion fixedly attached to said conveyor driving roller and capable of meshing with said operating pinion;

wherein said conveyor belt is capable of being driven by said operating motor.

9. The apparatus according to claim 7 further comprising:

a reduction motor connected to said conveyor belt for imparting movement thereto; and means for controlling said reduction motor.

10. The apparatus according to claim 9 wherein said means for controlling said reduction motor further comprises means for synchronizing the movement of said conveyor belt with the movement of said moveable frame.

11. The apparatus according to claim 7, wherein said plurality of product loaders further comprises one or more dosing stations capable of receiving and delivering a bulk, injectable, pourable, or semiliquid product; and wherein said apparatus further comprises a means for controlling the discharge of product from said dosing stations.

12. The apparatus according to claim 11 wherein said means for controlling the discharge of product from said dosing stations further comprises a position detector attached to said moveable frame.

13. The apparatus according to claim 11 wherein said means for controlling the discharge of product from said dosing stations further comprises a portion of said moveable frame which contacts said one or more dosing stations and causes the discharge of product.

14. The apparatus according to claim 1 wherein said apparatus further comprises a position detector fixedly attached to said bedplate and adapted to detect the presence of the product in said product loaders.

15. The apparatus according to claim 1 wherein the position of at least one of said product loaders is adjustable in three orthogonal directions with respect to a corresponding transverse bridge.

16. The apparatus according to claim 15 wherein the vertical position of said product loader is adjustable with respect to a respective said cutting blade.

17. The apparatus according to claim 15 wherein the transverse position of said product loader is adjustable with respect to said transverse bridge.

18. The apparatus according to claim 15 wherein the longitudinal position of said product loader is adjustable with respect to said transverse bridge.

19. The apparatus according to claim 15 wherein at least one of said product loaders further comprises:

a tubular cross-section;

corrugated walls; and at least one vertical slot capable of displaying the product and facilitating withdrawal of the product.

20. The apparatus according to claim 19 wherein at least one of said product loaders further comprises a square cross-section.

21. The apparatus according to claim 19 wherein at least one of said product loaders further comprises a rectangular cross-section.

22. The apparatus according to claim 15 wherein at least one of said product loaders has a square cross-section which is adjustable in size, wherein said product loader further comprises:

a plurality of guides;

a plurality of angular elements separated by said guides, wherein said angular elements form the corners of said square cross-section;

wherein the size of said cross-section is adjusted by varying the relative positions of said angular elements with respect to said guides.

23. The apparatus according to claim 1 wherein at least one of said base plates is adjustably attached to said moveable frame by one or more threaded fasteners, whereby the relative distance between the base plate and the bottom mouth of the product loader is adjustable.

24. The apparatus according to claim 1 further comprising a means for continuously supplying products to the product loaders.

25. The apparatus according to claim 24 further comprising:

at least one supply conveyor for supplying product to the product loaders;

means for controlling the supply of product to said product loaders, said means including a product presence detector.

26. The apparatus according to claim 1 wherein each transverse bridge supports at least three product loaders in transverse relationship.

27. The apparatus according to claim 26 wherein said cutting blade further comprises a horizontal rotating circular blade.

28. The apparatus according to claim 27 wherein at least one product loader located in a center position is longitudinally disposed farther away from said cutting blade than one or more collateral product loaders disposed on the same transverse bridge.

29. The apparatus according to claim 1 wherein said cutting blade further comprises a horizontal rotating circular blade, said blade including:

a through hole disposed in the center;

a cutting edge having a bevel cut; and a recess disposed on the top surface and extending generally from the through hole to the cutting edge.

30. The apparatus according to claim 29 wherein said cutting blade further comprises at least one anti-skid surface coating.

31. The apparatus according to claim 30 wherein said anti-skid coating further comprises a solid surface treatment.

32. The apparatus according to claim 30 wherein said anti-skid coating further comprises a layer of lubricant.

33. The apparatus according to claim 29 wherein said cutting blade further comprises a means for facilitating the sliding of product with respect to said blade.

34. The apparatus according to claim 33 wherein said means for facilitating the sliding further comprises a plurality of grooves disposed on a surface of said blade.

35. The apparatus according to claim 33 wherein said means for facilitating the sliding further comprises a plurality of holes disposed on a surface of said blade.

36. The apparatus according to claim 1 wherein at least one of said product loaders is capable of being inclined up to about thirty degrees with respect to said moveable frame, thereby allowing the formation and delivery of elongated slices.

37. The apparatus according to claim 1 wherein said cutting blades are capable of being adjusted longitudinally with respect to said base plates.

38. The apparatus according to claim 1 wherein at least one of said base plates further comprises:

a guide strip attached to the top surface of said base plate, the guide strip having a cantilever portion projecting obliquely downwardly, wherein said guide strip is adapted to reduce transverse movement of a product loaf disposed on said base plate; and wherein said cantilever portion is adapted to seat the cutting blade;

whereby said cantilever portion is capable of scraping the product from the curing blade; and whereby said guide strip is capable of positioning the slices of product upon said conveyor belt.

39. The apparatus according to claim 1 wherein said apparatus further comprises longitudinal guides attached to said bedplate;

wherein said conveyor belt is adapted to slide upon said longitudinal guides; and wherein said conveyor belt further comprises locking means for selectively fixing the position of said conveyor belt with respect to said bedplate.

40. The apparatus according to claim 1 wherein said conveyor belt further comprises a plurality of spaced apart product positioning means.

41. The apparatus according to claim 40 wherein said product positioning means further comprises a plurality of buckets.

42. The apparatus according to claim 40 wherein said product positioning means further comprises a plurality of alveoli.

43. The apparatus according to claim 1 wherein said products further comprise meat, cheese, or fish.

44. The apparatus according to claim 1 wherein said sandwich varieties further comprise breaded and fried cuts of meat, breaded and fried combinations of meat and cheese, and breaded and fried combinations of fish and cheese.

45. The apparatus according to claim 1 wherein said sandwich varieties further comprise ham and cheese, San Jacobos, San Marinos.

46. The apparatus according to claim 1 wherein said edible crusts further comprise edible pressed products.

* * * * *